May 30, 1950 C. C. BAUERLEIN ET AL 2,509,798
LIQUID DISPENSER
Filed Dec. 28, 1944 3 Sheets-Sheet 1

Inventors
Carl C. Bauerlein
James K. Lund
By The Firm of Charles K. Hills
Attys.

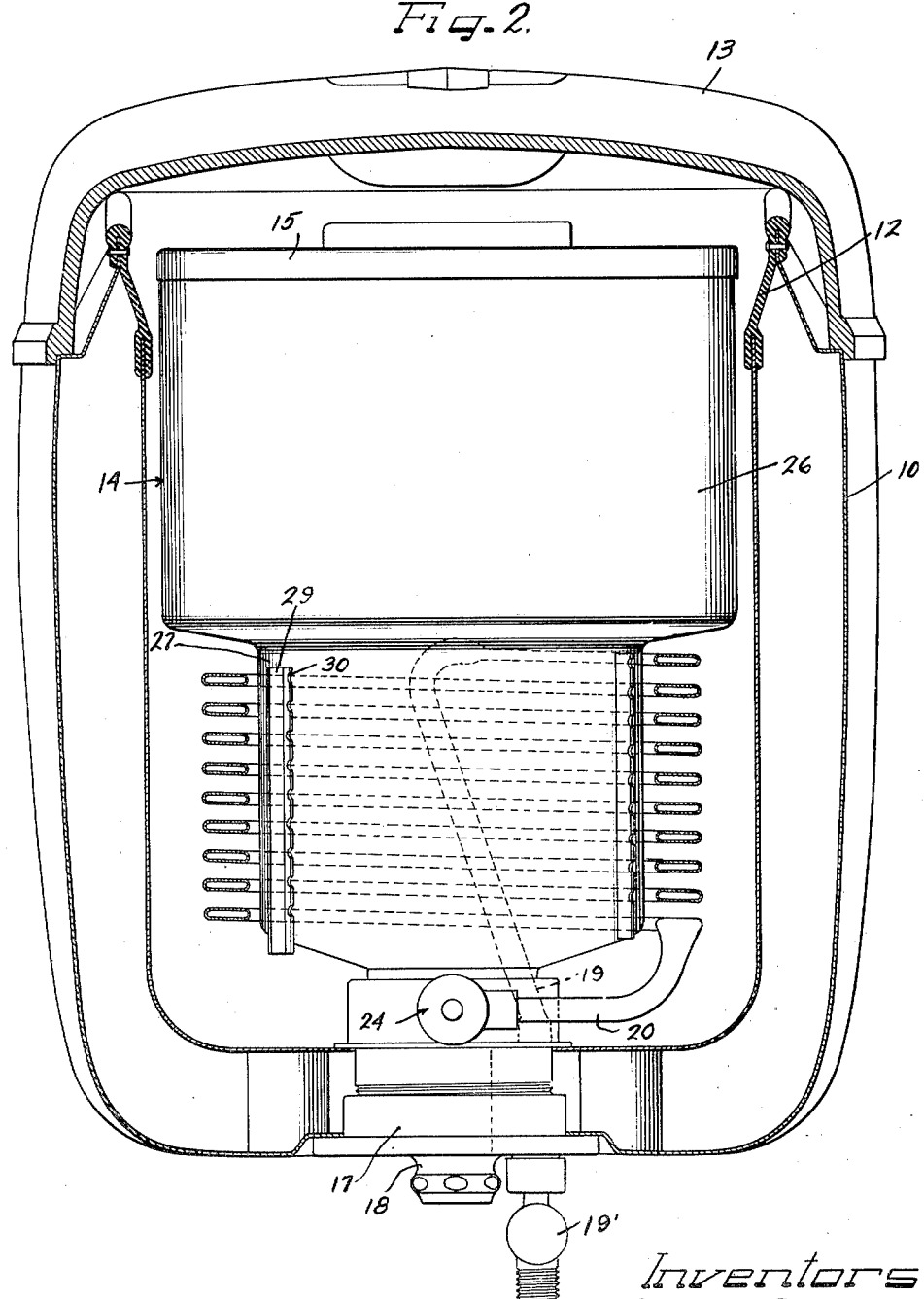

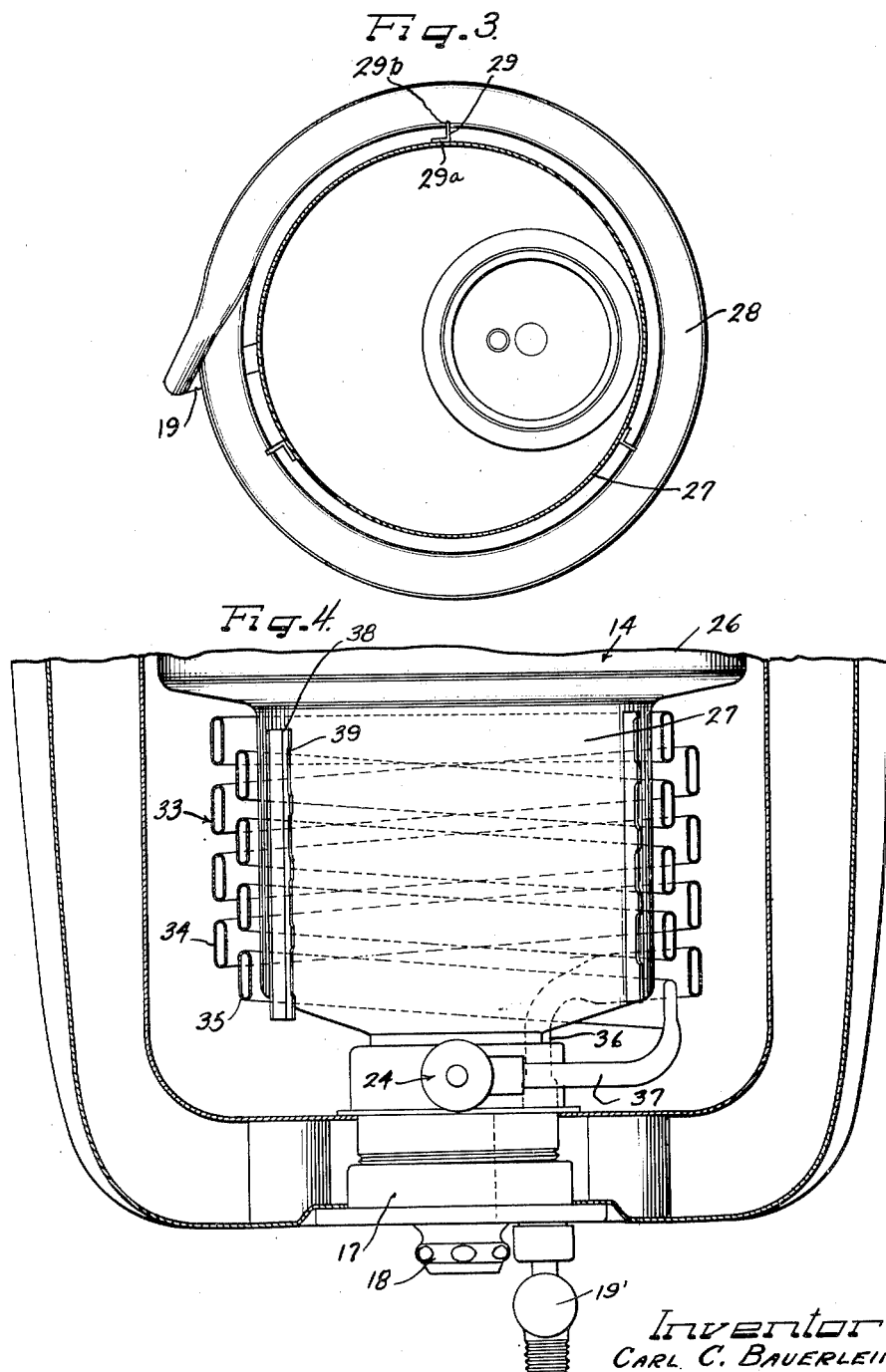

Patented May 30, 1950

2,509,798

UNITED STATES PATENT OFFICE 2,509,798

LIQUID DISPENSER

Carl C. Bauerlein, Glencoe, and James K. Lund, Oak Park, Ill., assignors to The Dole Valve Company, Chicago, Ill., a corporation of Illinois Application December 28, 1944, Serial No. 570,058

3 Claims. (Cl. 225—40)

Our invention relates to liquid dispensers, and to a dispensing device of the type wherein one liquid such as a syrup, is arranged to be dispensed with a carbonated liquid for mixture externally of the liquid dispenser to form a beverage.

In the dispensing of a plurality of liquids, such as in the production of a beverage in which carbonated water is used with a flavoring syrup, it is highly desirable that the uniformity of the resulting drink be maintained with fidelity in order to insure the uniformity in the taste of successive drinks. The maintenance of the proper proportions of the component liquids combined to form the drink is determinative of the resulting taste and uniformity of mixture.

It has therefore been customary in the dispensing of drinks of the above mentioned type to employ a liquid dispenser which includes an arrangement for dispensing a predetermined quantity of the flavoring syrup and for simultaneously dispensing the carbonated liquid. Another important characteristic of such a beverage in order to maintain the uniformity and high quality of the taste of successive drinks is to cool both the syrup and the carbonated liquid to the proper temperature so that they will be dispensed in the proper state of coolness in a glass for a user to drink. To this end it has been customary to form such a liquid dispenser of an enclosing casing with a syrup tank therein with a suitable refrigerating medium such as ice in the casing and around the tank. The carbonated liquid has also been cooled such as by withdrawing the liquid from a storage which is maintained at the proper temperature or by providing a conduit attached to the side walls of the casing through which the carbonated liquid will travel so that it may be cooled by the refrigerating medium such as ice water inside the casing.

In view of the importance of maintaining the temperatures of the syrup and carbonated liquid at more nearly the desired temperature, it is therefore an object of our invention to provide an improved liquid dispenser construction which is simple to manufacture and which will still maintain the desired temperatures of the liquids.

It is another object of our invention to provide a liquid dispenser of the above mentioned type with an improved syrup tank and carbonated liquid conduit structure so as to maintain the desired temperature of the two liquids in order to produce a uniformly high quality drink when the liquids are dispensed from the dispenser.

Further objects and advantages of our invention will become apparent from the following description referring to the accompanying drawings, and the features of novelty which characterize our invention will be pointed out with particularity in the claims annexed to and forming a part of this specification.

On the drawings:

Figure 2 is a view taken along the lines II—II of Figure 1 and illustrating the carbonated liquid conduit coils in section;

Figure 3 is a top view taken along the lines III—III of Figure 2; and

Figure 4 is a side elevation in partial section of a liquid dispenser provided with a modification of our invention.

Figure 1:
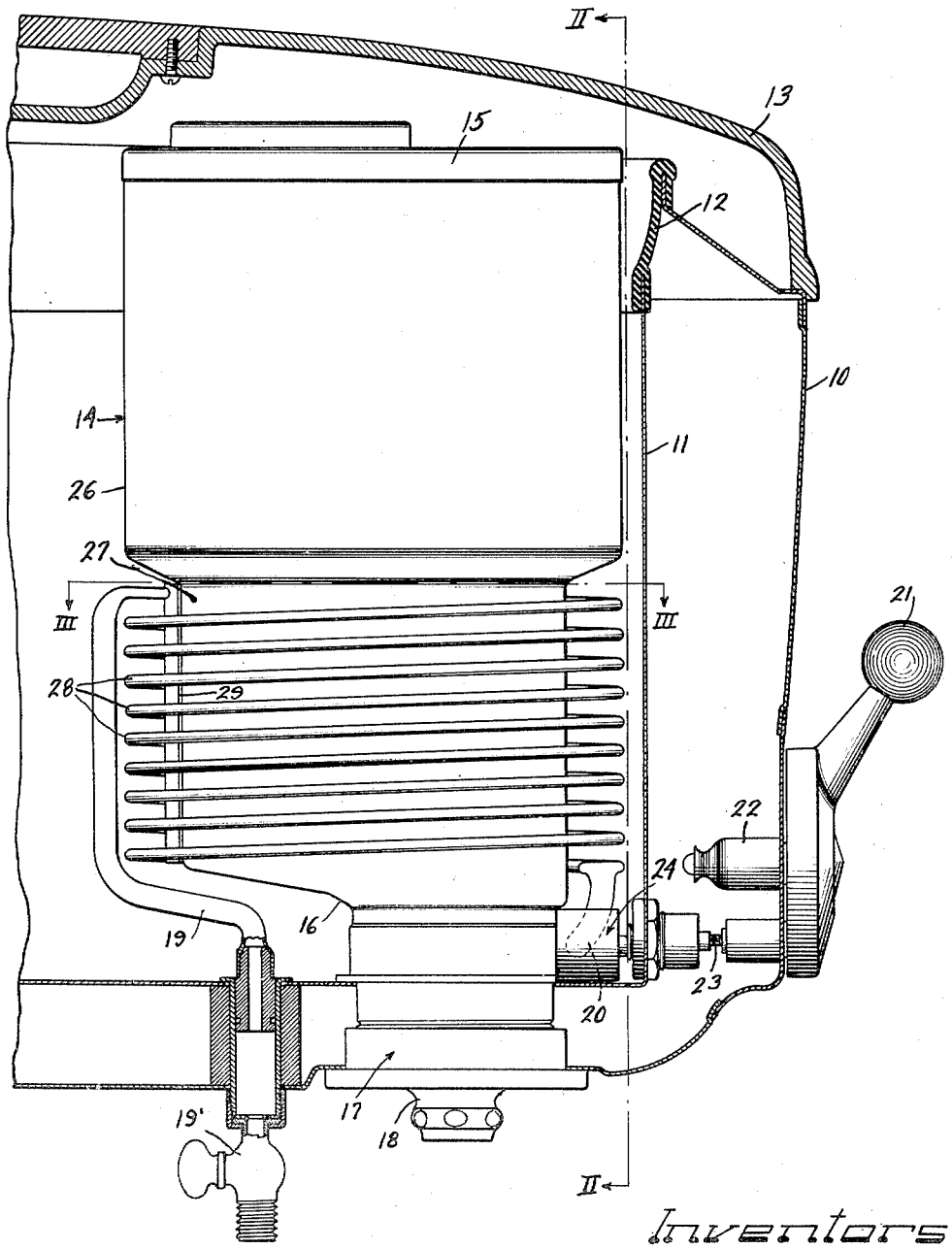
Figure 1 is a side view in partial section illustrating a drink dispenser which is provided with an embodiment of our invention.

Referring to Figure 1 of the drawings, we have illustrated a liquid dispenser which has particular application for dispensing a beverage including a flavoring syrup and a carbonated liquid, the dispenser including a casing having an outer wall 10 and a spaced inner wall 11, the walls being spaced so that a suitable heat insulating medium may be provided between the spaced walls. A suitable flexible insulating member 12 is provided adjacent the top of the casing for closing the space between the outer and inner walls 10 and 11, respectively. A removable cover 13 is provided for the casing so as to facilitate access to the parts of the dispenser within the casing. Within the inner wall 11 of the casing, we provide a tank indicated generally by the numeral 14 which is adapted to contain the flavoring syrup for the beverage. A removable cover member 15 is provided for the tank so that the supply of syrup therein may be replenished. The bottom of the tank 14 communicates through a restricted portion 16 to a liquid dispenser head which is indicated generally by the numeral 17 which dispenser head is supported between the spaced walls 10 and 11 at the bottom of the dispenser. A nozzle 18 is provided which is connected to the liquid dispenser head, the nozzle 18 projecting outside the outer wall 10 of the casing. A tubular conduit 19 is provided having an end connected through a valve 19' so that a source of suitable carbonated liquid may be connected to the conduit 19. The other end of the conduit 19 as is indicated at 20 is also connected to the dispenser head 17 so that both carbonated liquid and flavoring syrup may be simultaneously dispensed whenever desired through the dispenser head 17 and nozzle 18. For a more detailed description of the dispenser head 17 and nozzle 18, reference may be had to a copending application Serial No. 575,782, (case No. 44,699), filed in the names of Bauerlein and Michalsen. A dispensing handle 21 is provided having a shaft (not shown) extending through the outer wall 10 of the casing into a suitable housing indicated by the numeral 22. This housing may contain any suitable mechanism such as camming surfaces for moving the handle perpendicular to the housing for operating plunger mechanism 23 longitudinally which in turn operates a suitable valve mechanism indicated generally by the numeral 24. It will be understood that operation of the valve 24 will cause the carbonated liquid in the tubular conduit 19 to flow through the dispenser head 17 and out the nozzle 18. This will simultaneously cause a predetermined amount of flavoring syrup to also be dispensed through the nozzle 18, and for a further and more detailed description of this operation of the dispenser head, reference may be had to the above mentioned copending application of Bauerlein and Michalsen.

As has already been mentioned, it is important in the dispensing of a beverage including a flavoring syrup and a carbonated liquid to provide the liquids of the proper temperature as they pass out through the dispensing head and nozzle to be discharged in a suitable glass where the liquids may be consumed as a beverage. In order, therefore, to provide an efficient structure for cooling both of the liquids the tank 14 which has an upper substantially rectangularly shaped portion 26 is provided with a lower portion 27 which has a substantially tubular shape as will be noted from an inspection of both Figures 1 and 2. It will also be seen that the depending tubular portion 27 of the tank has a smaller diameter than either the length or the width of the rectangularly shaped tank portion 26. In order to further provide a construction in which the cooling of both of the liquids is facilitated by the same refrigerating means, we provide the tubular conduit 19 with a plurality of turns 28 which are disposed around the tubular portion 27 of the tank 14. As will be seen from an inspection of Figures 1 and 2, the turns are formed as a spiral and progress from the upper end of the tubular tank portion 27 to the lower end where they communicate through the end 20 of the conduit to the dispenser head 16. In order to provide a convenient arrangement for supporting the plurality of turns 28 spaced a slight amount from each other and also from the outer walls of the tubular tank portion 27, we provide a plurality of support members 29 disposed around the outer periphery of the tubular tank portion 27. Any suitable number may be employed, and as will be seen in Figure 3, three such support members 29 are provided having a generally L-shaped construction with one leg of the L identified as 29a which is attached to the outer wall of the tank 27 in any suitable manner such as by welding. It will be seen that the L-shaped members 29 project longitudinally along the outer surface of the tank portion 27 and a plurality of notches 30 are provided in the other leg 29b of the L-shaped members. It will be seen that these notches are spaced the same distance as adjacent turns 28 and the inner edges of the turns are supported by the L-shaped members 29 within the notches 30. It will also be seen that the contours of the notches correspond with the contours of the adjacent surfaces of the turns 28.

Any suitable cross-sectional shape of tubular member having turns 28 may be provided and in the construction illustrated in Figures 2 and 3, it will be seen that an oval shaped coil is provided with the longer axis of the oval perpendicular to the side walls of the tubular tank portion 27.

In Figure 4, we have illustrated a modification of the tubular turn construction in which turns indicated generally by the numeral 33 are provided of oval shape and with the longitudinal axis of the oval parallel with the outer surface of the tank portion 27. It will also be seen with the construction of Figure 4 that two layers of turns are provided indicated by the numerals 34 and 35, and the turns progress from the intake end 36 spirally upwardly to provide the outer layer 34 and then spirally downwardly to provide the inner layer 35 with the inner end 37 connected to the valve structure 24. It will be seen that in the construction of Figure 4, supporting members 38 are provided similar to the supporting members 29 except that the notches 39 have a different shape so as to correspond with the shape of the turns which are supported in the notches.

It will be understood that in operating the drink dispenser described above that a suitable refrigerating medium such as cracked ice is placed inside the inner side wall 11 of the casing thus the melting of the ice into water will provide a circulating cooling medium which will flow around the outer wall of the tubular portion 27 of the syrup tank 14 thus cooling the syrup and at the same time this ice water may circulate around the turns 28 which are spaced slightly from the outer wall of the tank 27 and also spaced from each other. It will therefore be seen that we have provided an extremely simple and efficient arrangement for cooling both the syrup and the carbonated water to the desired temperature so as to maintain the high quality and consistency of the successive drinks which are dispensed through the dispenser head 16 and the nozzle 17.

Although we have shown and described particular embodiments of our invention, we do not desire to be limited to the particular embodiments described, and we intend in the appended claims to cover all modifications which do not depart from the spirit and scope of our invention.

We claim as our invention:

1. In a removable storage unit for disposition in a refrigerant box, a container for liquid, such as syrup and the like, said container having a depending reduced portion terminating in a nozzle receiving portion, a discharge nozzle in said portion, a coil about said reduced depending portion for connection to a source of carbonated fluid at one end and connected at its other end to said nozzle, said coil being wound about said reduced portion, and spaced supporting strips carried by said reduced portion about which said coil is spirally wound in the direction of the length of the container and attached thereto so as to be an integral component upon said container with the turns of said coil held in fixed spaced relation from each other and from the wall of said container.

2. In a removable storage unit for disposition in a refrigerant box, a container for liquid, such as syrup and the like, said container having a depending reduced portion terminating in a nozzle receiving portion, a discharge nozzle in said portion, a coil about said reduced depending portion for connection to a source of carbonated fluid at one end and connected at its other end to said nozzle, said coil being of flattened cross-section and being disposed below the syrup container and wound about said reduced portion, and spaced supporting strips carried by said reduced portion about which said coil is spirally wound in the direction of the length of the container and attached thereto so as to be an integral component upon said container with the turns of said coil held in fixed spaced relation, each of said strips being of an L-shape and having one leg attached to the container and the other leg provided with notches for receiving the turns of said coil.

3. A removable storage unit for confining two separate liquids to be cooled in a refrigerant box comprising a storage chamber for a first liquid, a coil disposed about said storage chamber for holding a second liquid, vertical members on the outside of said chamber associated with said coil for supporting the same, the liquid in said chamber and in said coil being separated from the refrigerant in the refrigerant box by a single thickness of metal, said coil being in contact on all sides with the refrigerant and having one end removably disposed in the housing of the refrigerant box, said chamber having a nozzle portion removably positioned in the housing of said box, whereby said removable storage unit may be positioned in the refrigerant box as a unit.

CARL C. BAUERLEIN.
JAMES K. LUND.

REFERENCES CITED

The following references are of record in the file of this patent:

UNITED STATES PATENTS

| Number | Name | Date |
|---|---|---|
| 1,907,641 | Askin | May 9, 1933 |
| 2,121,341 | Tweed | Jan. 28, 1938 |